US012098835B1

(12) United States Patent
Shen

(10) Patent No.: US 12,098,835 B1
(45) Date of Patent: Sep. 24, 2024

(54) POOL LIGHT

(71) Applicant: Jiashun Shen, Guangdong (CN)

(72) Inventor: Jiashun Shen, Guangdong (CN)

( * ) Notice: Subject to any disclaimer, the term of this patent is extended or adjusted under 35 U.S.C. 154(b) by 0 days.

(21) Appl. No.: 18/674,822

(22) Filed: May 25, 2024

(51) Int. Cl.

| | |
|---|---|
| ***F21V 27/00*** | (2006.01) |
| ***E04H 4/14*** | (2006.01) |
| ***F21S 9/03*** | (2006.01) |
| ***F21V 17/10*** | (2006.01) |
| ***F21V 17/12*** | (2006.01) |
| ***F21V 17/16*** | (2006.01) |
| ***F21V 23/00*** | (2015.01) |
| ***F21V 23/02*** | (2006.01) |
| ***F21W 131/401*** | (2006.01) |
| ***F21Y 105/10*** | (2016.01) |
| ***F21Y 113/00*** | (2016.01) |
| ***F21Y 115/10*** | (2016.01) |

(52) U.S. Cl.
CPC ............. *F21V 27/00* (2013.01); *E04H 4/148* (2013.01); *F21S 9/032* (2013.01); *F21V 17/105* (2013.01); *F21V 17/12* (2013.01); *F21V 17/162* (2013.01); *F21V 23/002* (2013.01); *F21V 23/023* (2013.01); *F21W 2131/401* (2013.01); *F21Y 2105/10* (2016.08); *F21Y 2113/00* (2013.01); *F21Y 2115/10* (2016.08)

(58) Field of Classification Search
CPC ....... E04H 4/148; F21V 27/00; F21V 17/105; F21V 17/12; F21V 17/162; F21V 23/002; F21V 23/023; F21S 9/032; F21W 2131/401; F21Y 2105/10; F21Y 2113/00; F21Y 2115/10
See application file for complete search history.

(56) References Cited

U.S. PATENT DOCUMENTS

| | | | | |
|---|---|---|---|---|
| 5,842,771 A * | 12/1998 | Thrasher | F21V 29/00 | 362/267 |
| 10,890,007 B2 * | 1/2021 | Foy | F21V 33/006 | |
| 12,007,103 B1 * | 6/2024 | Gong | F21V 21/096 | |
| 2007/0247838 A1 * | 10/2007 | Fan | F21S 9/032 | 362/267 |

FOREIGN PATENT DOCUMENTS

| | | | | |
|---|---|---|---|---|
| WO | WO 2010020732 | * 2/2010 | | E04H 4/14 |

OTHER PUBLICATIONS

WO 2010/020732 Philippe et al, Feb. 25, 2010, English Translation (Year: 2010).*

* cited by examiner

*Primary Examiner* — Peggy A Neils
(74) *Attorney, Agent, or Firm* — Hawaii Patent Services; Nathaniel K Fedde; Kenton N. Fedde

(57) ABSTRACT

A novel pool light comprises a power supply device, a lighting device, and a power cable mounted between the power supply device and the lighting device. The lighting device comprises a light fixture and a cable winding mechanism for winding the power cable. The cable winding mechanism comprises a rotating member having one side fixedly connected to the light fixture and a base plate rotatably connected to the other side of the rotating member, and a recess between the periphery of the rotating member and the periphery of the base plate forms a cable trough allowing the power cable to be wound therein.

18 Claims, 11 Drawing Sheets

POOL LIGHT

BACKGROUND OF THE INVENTION

1. Technical Field

The invention relates to the technical field of pool lights, in particular to a novel pool light.

2. Description of Related Art

Pool lights, as underwater lights specifically for illuminating swimming pools, not only can illuminate swimming pools with soft light, but also can create a pleasant atmosphere and comfortable environment for swimming pools.

In the prior art, there are mainly two types of outdoor pool lights: pool lights connected to an external power supply and pool lights provided with a battery. As for the pool lights connected to an external power supply, U.S. Pat. No. 11,320,102B2 discloses a battery-powered pool light assembly and records, in Paragraph 0038 of the description, that "to ensure that all electrical supplies are at a safe distance from the pool, the cable will preferably be relatively long. In an exemplary embodiment, the cable may be on the order of around 4 to 5 meters (15-20 feet) long". It thus can be seen that the pool lights connected to an external power supply generally has a long power cable. Although such pool lights have high brightness and a long battery life, the long power cable is inconvenient to store and has a negative effect on the appearance of the lights.

As for the pool lights provided with a battery, a dry battery or lithium battery is directly arranged in the light, so such pool lights are easy to store; however, the battery life is short, and the battery needs to be replaced or charged in time.

Therefore, it is necessary to provide a novel outdoor pool light, which can generate power by means of solar energy, store the power, and transmit the power to a lighting device for lighting if necessary, so as to prolong the battery life of the pool light; in addition, after the novel outdoor pool light is mounted in a swimming pool, the redundant portion of a power cable can be wound to be stored to guarantee the attractive appearance of the pool light.

BRIEF SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The invention provides a novel pool light and a carrying method to solve the problems of short battery life and poor appearance caused by a power cable of pool lights mentioned above.

To fulfill the above objective, the invention adopts the following technical solution:

A novel pool light comprises a power supply device, a lighting device, and a power cable mounted between the power supply device and the lighting device, wherein:

a cable winding mechanism comprises a rotating member having one side fixedly connected to a light fixture and a base plate rotatably connected to the other side of the rotating member, and a recess between a periphery of the rotating member and a periphery of the base plate forms a cable trough allowing the power cable to be wound therein;

the power supply device comprises a housing to be mounted on an edge of a swimming pool and a solar power supply assembly mounted on the housing, and the solar power supply assembly comprises a photovoltaic module and an energy storage module.

A novel pool light comprises a power supply device, a lighting device and a power cable mounted between the power supply device and the lighting device;

a cable winding mechanism comprises a rotating member having one side fixedly connected to a light fixture and a base plate rotatably connected to the other side of the rotating member, and recess between a periphery of the rotating member and a periphery of the base plate forms a cable trough allowing the power cable to be wound therein;

the power supply device comprises a housing to be mounted on an edge of a swimming pool and a solar power supply assembly mounted on the housing, and the solar power supply assembly comprises a photovoltaic module and an energy storage module;

a mounting assembly is arranged on a side, facing the edge of the swimming pool, of the housing and comprises a mounting plate separated from the housing, and a quick assembly and disassembly structure is arranged between the mounting plate and the housing.

A pool lighting method uses a novel pool light, wherein the novel pool light comprises a power supply device, a lighting device and a power cable mounted between the power supply device and the lighting device, the lighting device comprises a light fixture and a cable winding mechanism for winding the power cable, the cable winding mechanism comprises a base plate, a sealing cover is arranged on a side, backing onto a housing, of the base plate, the power supply device comprises a housing to be mounted on an edge of a swimming pool, a mounting assembly is arranged on a side, facing the edge of the swimming pool, of the housing and comprises a mounting plate separated from the housing, and a quick assembly and disassembly structure is arranged between the mounting plate and the housing and comprises a first clamping piece and a second clamping piece; the pool lighting method comprises the following steps:

Step 1, mounting the mounting plate on the edge of the swimming pool;

Step 2, mounting the housing on the mounting plate by means of the quick assembly and disassembly structure;

Step 3, mounting the lighting device in the swimming pool;

Step 4, winding a redundant portion of the power cable on the cable winding mechanism; and Step 5, turning on the lighting device to light the swimming pool.

BRIEF DESCRIPTION OF THE SEVERAL VIEWS OF THE DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
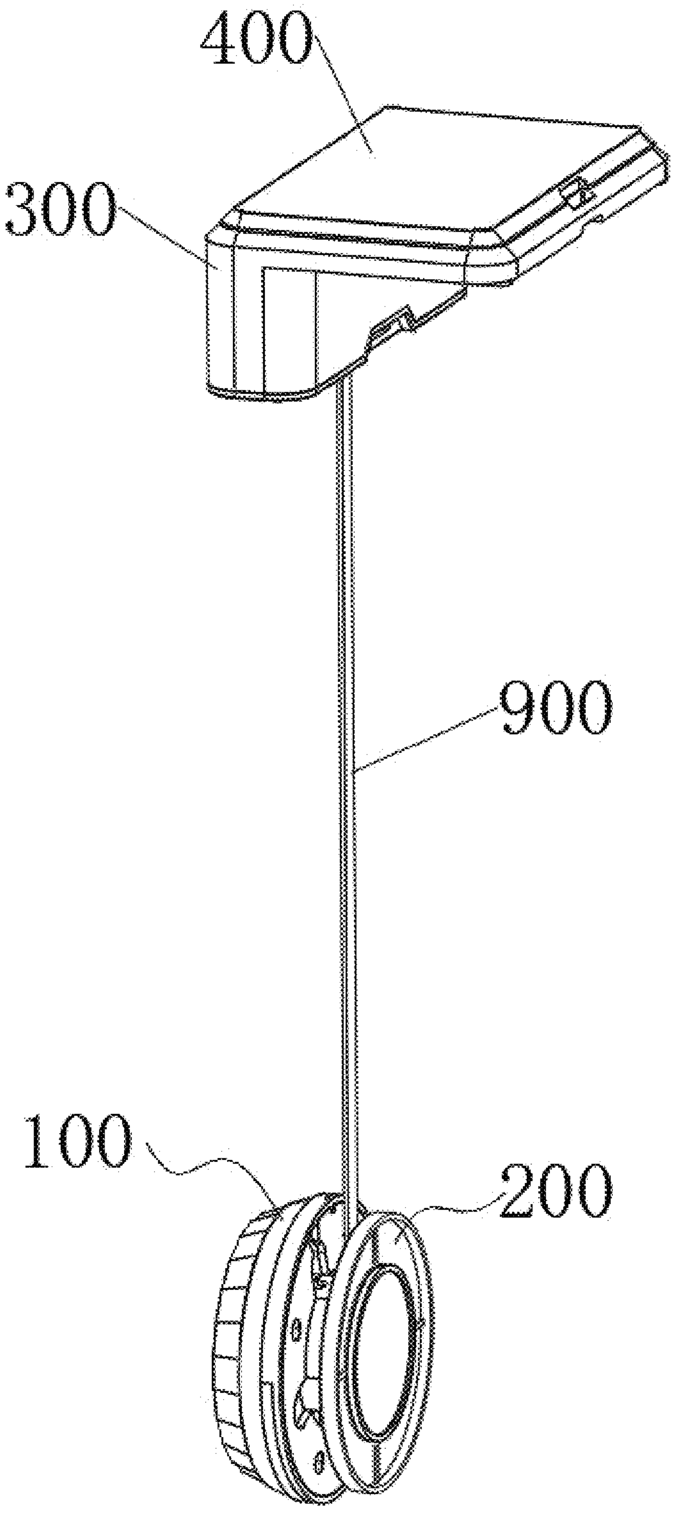
FIG. 1 is a schematic structural view of Embodiment 1 of the invention.
Figure 2:
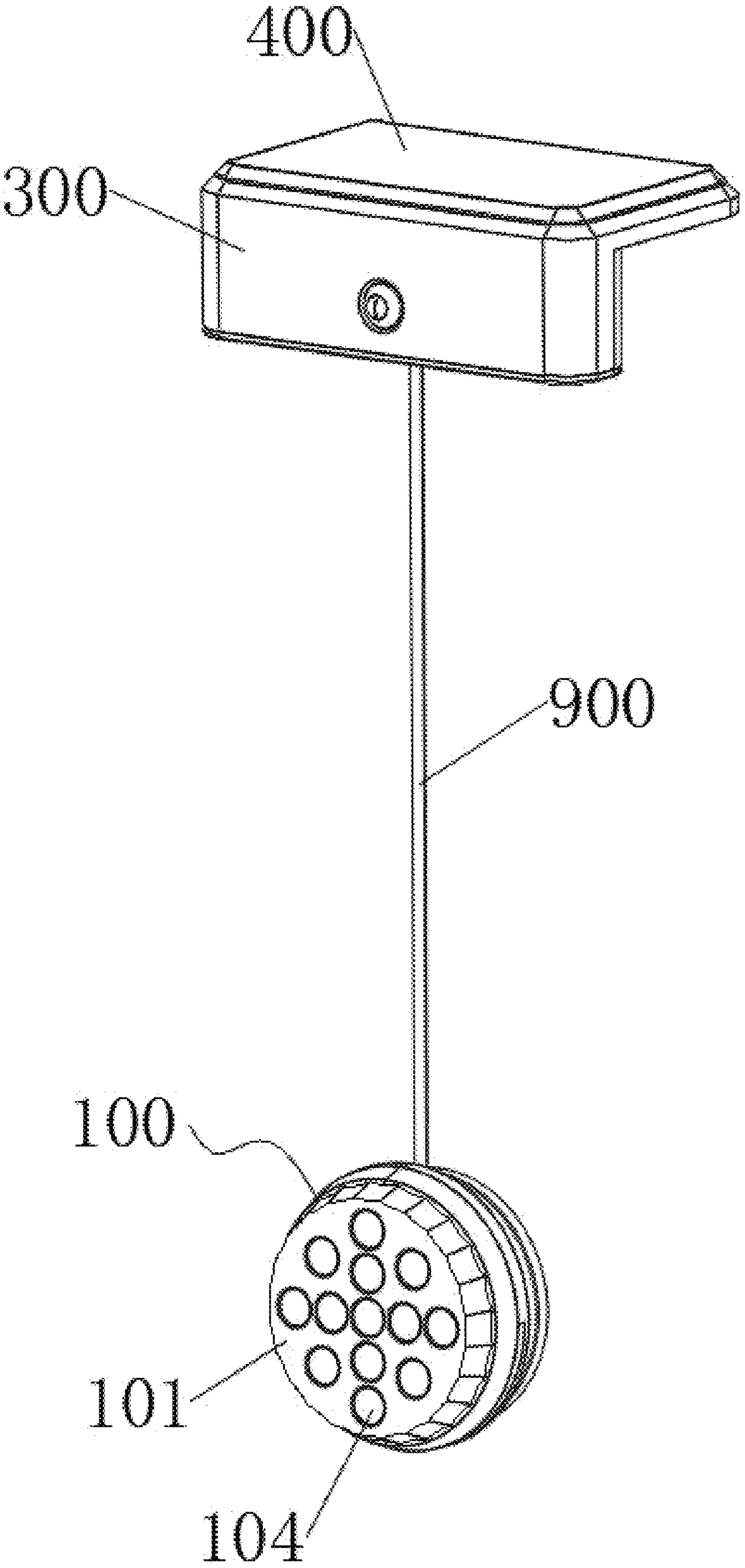
FIG. 2 is a schematic structural view of Embodiment 1 of the invention from another perspective.
Figure 3:
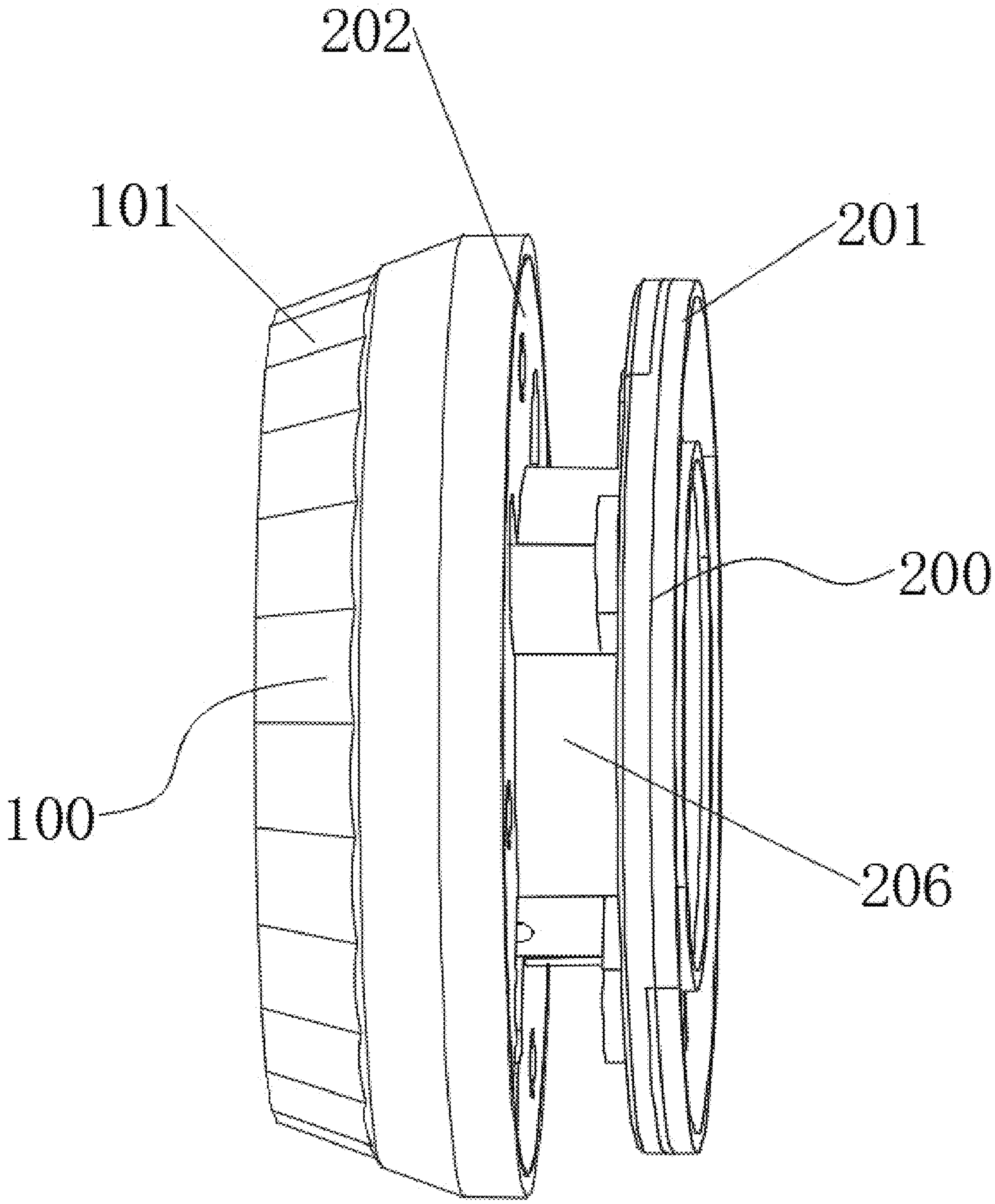
FIG. 3 a schematic structural view of a lighting device according to the invention.

In the FIGS.: 100, light fixture; 101, lamp shade; 102, LED lamp panel; 103, lamp bead; 104, lens; 200, cable winding mechanism; 201, base plate; 202, rotating member; 203, magnet; 204, magnetic element; 205, sealing cover; 206, cable trough; 300, housing; 301, first mating surface; 302, hole; 303, first clamping piece; 400, protective cover plate; 500, photovoltaic panel; 600, control circuit board; 700, storage battery; 800, mounting plate; 801, second mating surface; 802, second clamping piece; 900, power cable.

DETAILED DESCRIPTION OF THE INVENTION

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific detail.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Embodiment 1

Referring to FIG. 1 to FIG. 8,

The invention provides a novel pool light, comprising a power supply device, a lighting device, and a power cable 900 mounted between the power supply device and the lighting device, wherein the lighting device comprises a light fixture 100 and a cable winding mechanism 200 for winding the power cable 900, the cable winding mechanism 200 comprises a rotating member 202 having one side fixedly connected to the light fixture 100 and a base plate 201 rotatably connected to the other side of the rotating member 202, a recess between the periphery of the rotating member 202 and the periphery of the base plate 201 forms a cable trough 206 allowing the power cable 900 to be wound therein, the power supply device comprises a housing 300 to be mounted on an edge of a swimming pool and a solar power supply assembly mounted on the housing 300, and the solar power supply assembly comprises a photovoltaic module and an energy storage module.

In this embodiment, the housing 300 is L-shaped. In this way, the housing 300 can be attached to right-angle sides of the swimming pool and can be fixed to the edge of the swimming pool with screws or glue to fix the power supply device to the edge of the swimming pool, and the lighting device can be mounted in the swimming pool.

In other embodiments not shown, the housing 300 may be in other solid geometric shapes to adapt to edges of swimming pools in various other shapes.

The light fixture 100 comprises a lamp shade 101 and an LED lamp panel 102 mounted in the lamp shade 101, wherein at least one lamp bead 103 is mounted on the LED lamp panel 102, the rotating member 202 is mounted on one side of the lamp shade 101, at least one len 104 is mounted on a side, backing onto the base plate 201, of the lamp shade 101, the lens 104 is used together with the lamp bead 103, and an inner end of the lens 104 penetrates into the lamp shade 101 and is located outside the lamp bead 103.

After being powered on, the lamp bead 103 on the LED lamp panel 102 will emit light, which is then diffused to the outside by the lens 104, and the lamp shade 101 may be made from a transparent material to allow more light to be diffused to the outside.

Based on the above description, the middle of the base plate 201 is inlaid in the rotating member 202 and rotatably connected to the rotating member 202; a magnet 203 is mounted in a side, facing the lamp shade 101, of the rotating member 202; a magnetic element 204 is arranged on a side, backing onto the rotating member 202, of the base plate 201; the rotating member 202, the magnet 203, the base plate 201 and the magnetic element 204 are arranged coaxially; the magnet 203 attracts the magnetic element 204 through the base plate 201 and the rotating member 202; and the base plate 201 and the magnetic element 204 are covered with a sealing cover 205 for sealing the magnetic element 204.

Figure 4:
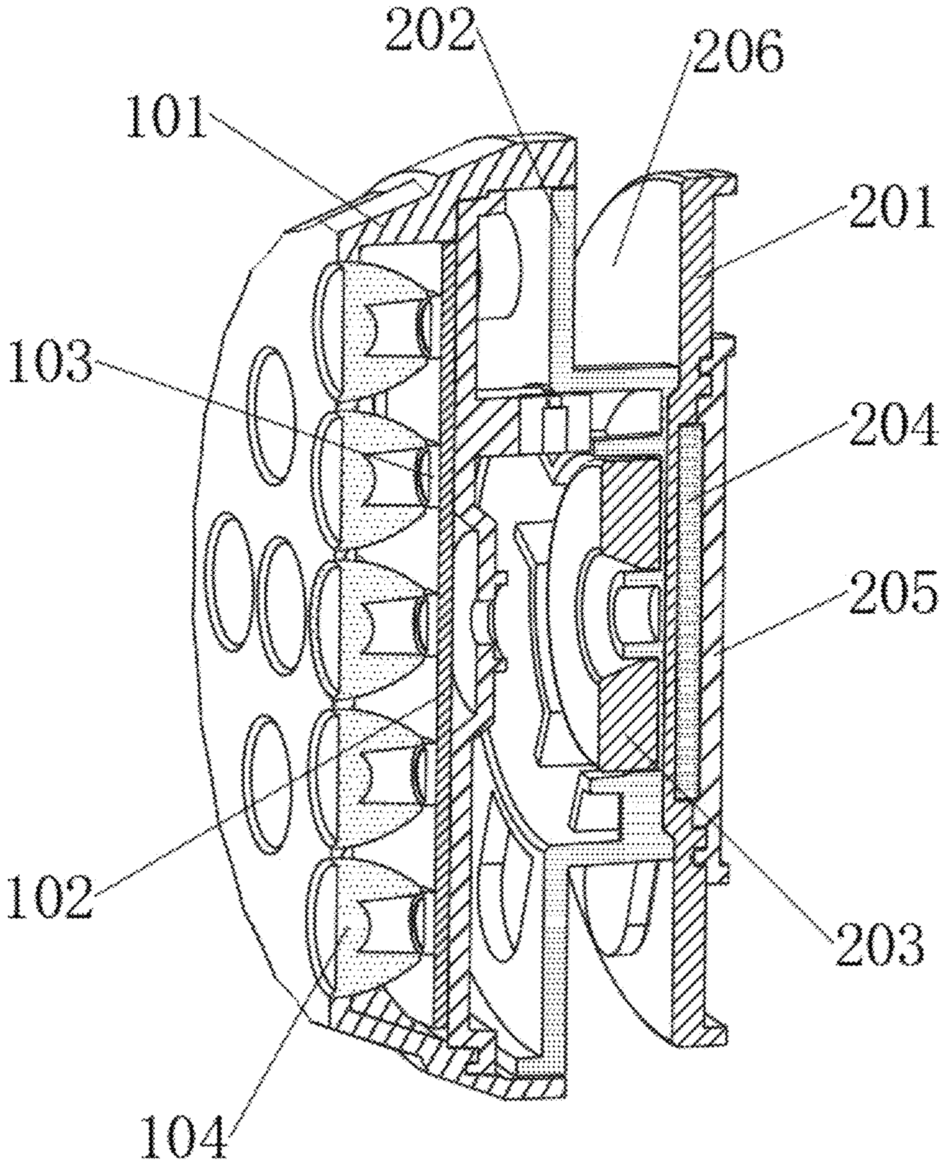
FIG. 4 is a sectional view of the lighting device according to the invention.
Figure 5:
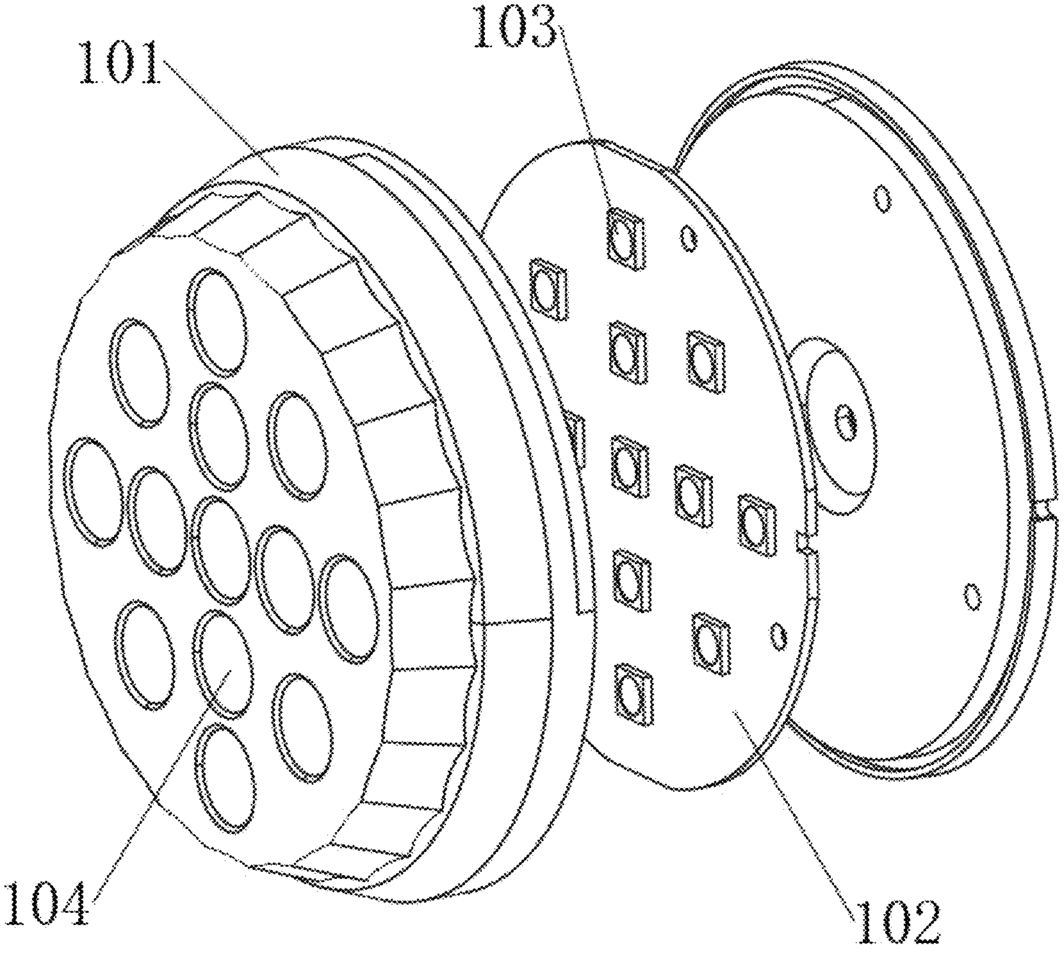
FIG. 5 is an exploded view of a light fixture according to the invention.
Figure 6:
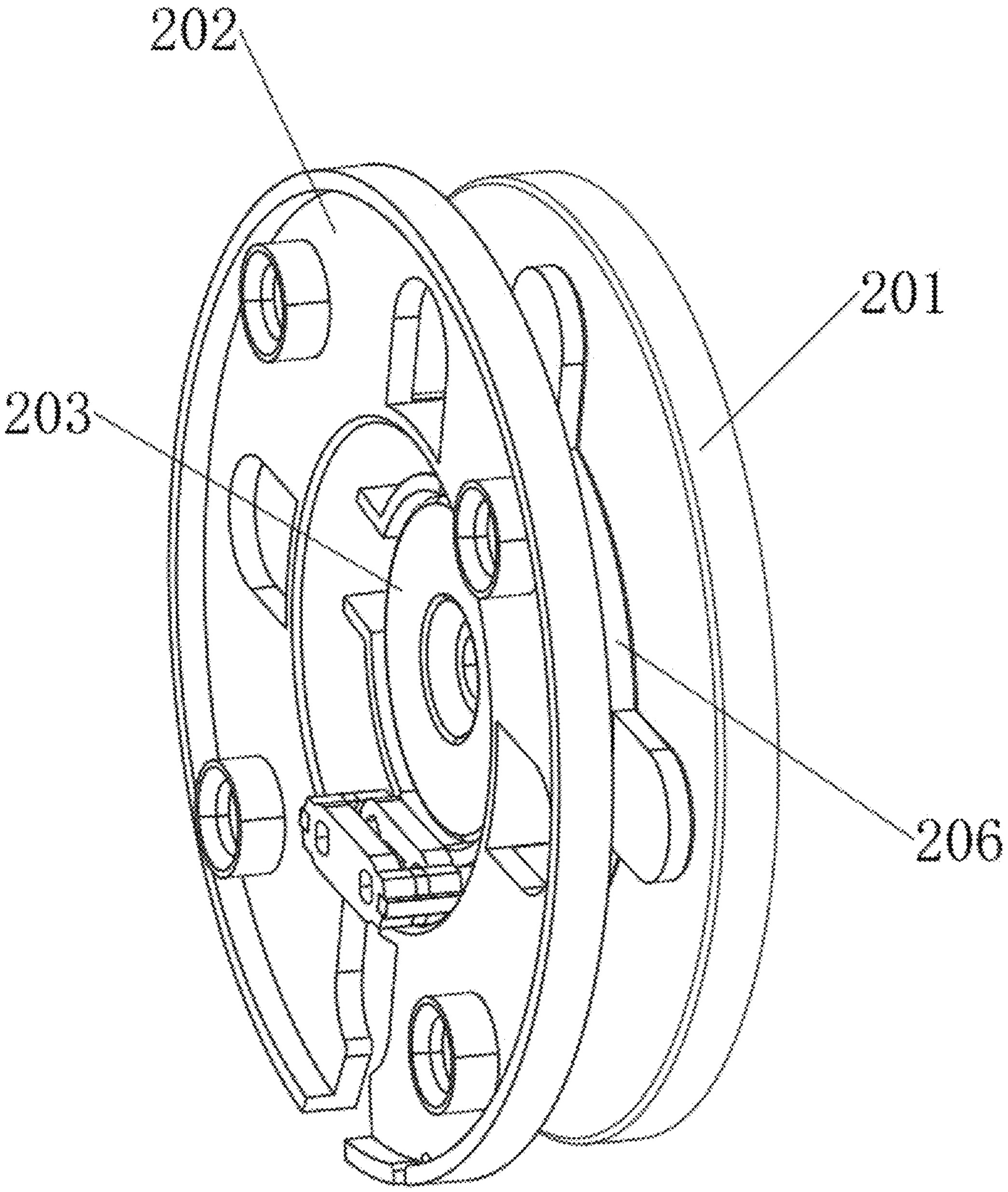
FIG. 6 is a schematic structural view of a cable winding mechanism according to the invention.
Figure 7:
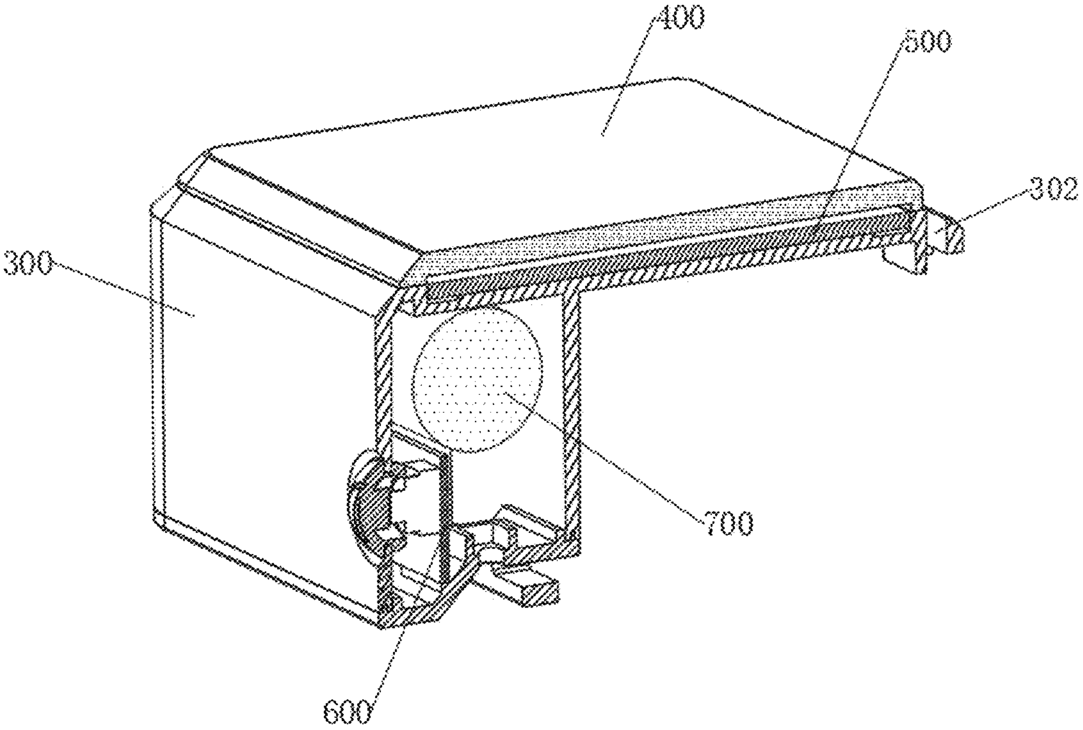
FIG. 7 is a sectional view of a power supply device according to Embodiment 1 of the invention.
Figure 8:
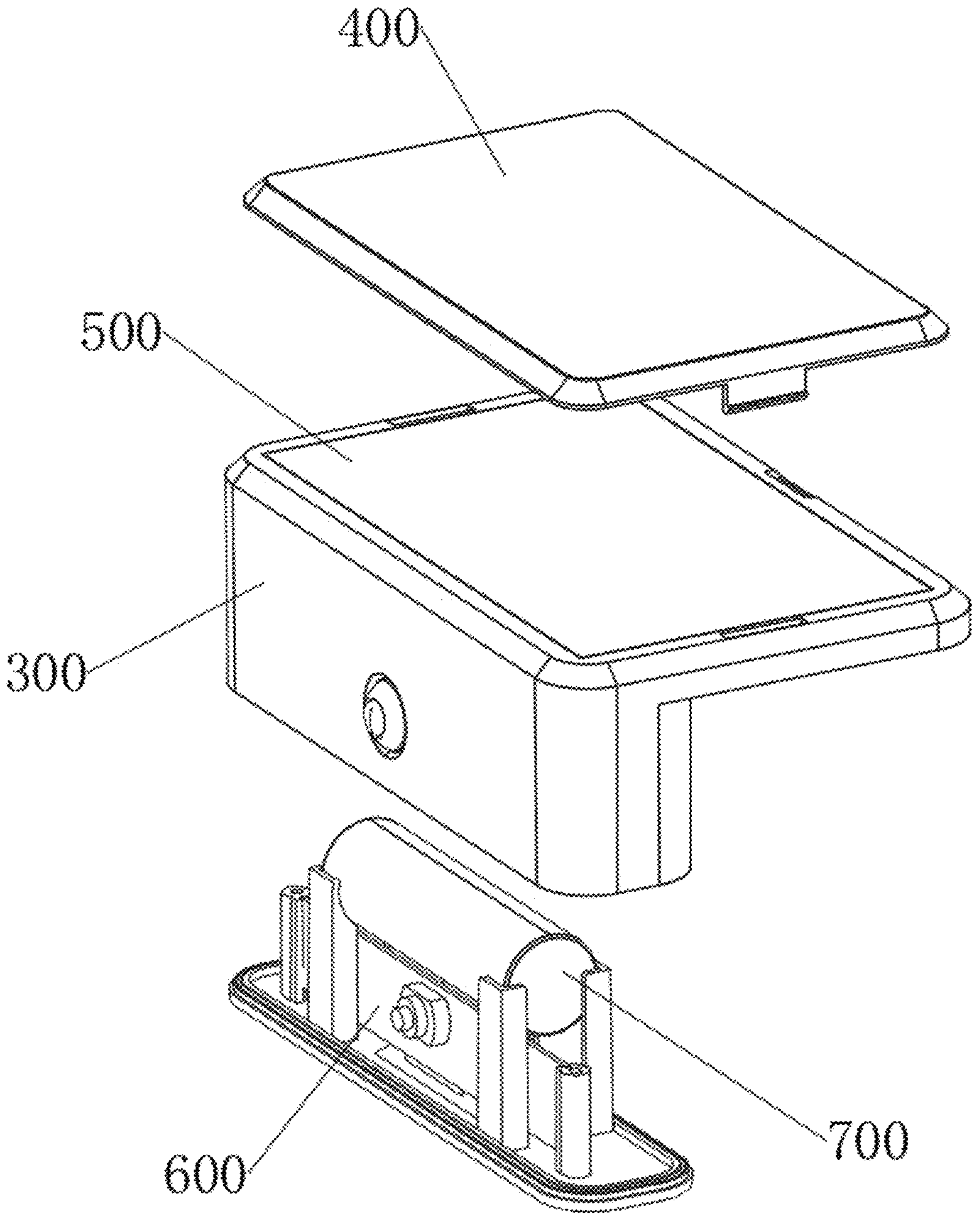
FIG. 8 is an exploded view of the power supply device according to Embodiment 1 of the invention.
Figure 9:
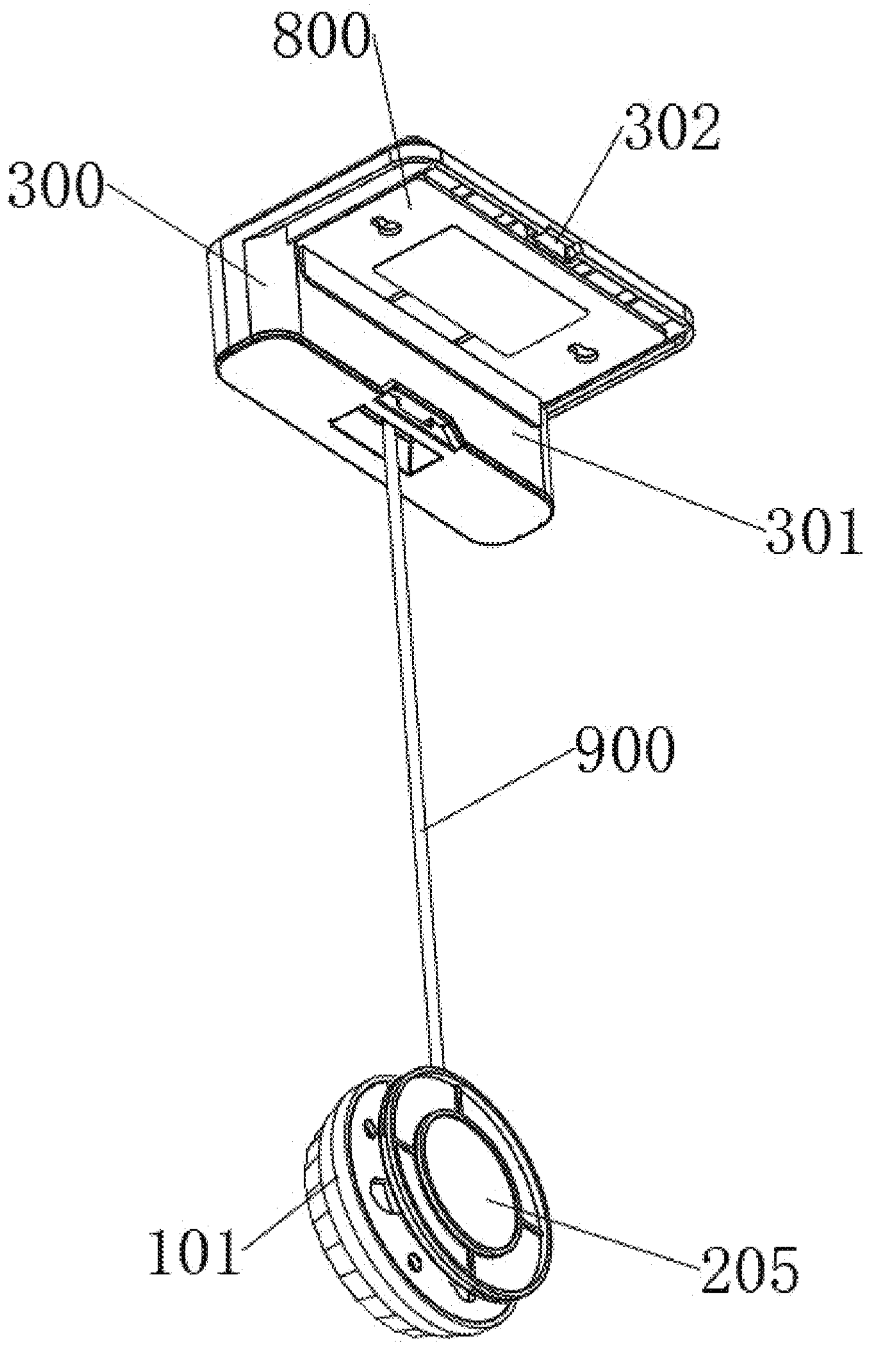
FIG. 9 is a schematic structural view of Embodiment 2 of the invention.

One end of the rotating member 202 is inlaid in the lamp shade 101, a gap is formed between the rotating member 202 and the lamp shade 101, and a sealant may be filled in the gap to improve the waterproofness and sealing performance of the lamp shade, as shown in FIG. 4.

The magnetic element 204 may be made from a magnetic material or a ferromagnetic material, such that the magnetic element 204 and the magnet 203 can be attracted at a certain distance.

Because the magnet 203 and the magnetic element 204 are magnetically attracted and the rotating member 202 and the base plate 201 are rotatably connected, the rotating member 202 and the base plate 201 can rotate relatively, and the rotating member 202 can be detached from the base plate 201 by applying a pulling force to overcome the magnetic attraction force between the magnet 203 and the magnetic element 204.

The sealing cover 205 and the base plate 201 may be coated with glue, and then the base plate can be bonded in the swimming pool with the glue, such that the lighting device can be mounted in the swimming pool; and when the light fixture 100 emits light, the swimming pool will be lighted.

Because the rotating member 202 and the base plate 201 are connected detachably and rotatably, the light fixture 100 can rotate and be detached from the base plate 201 after the lighting device is mounted in the swimming pool.

Based on the above description, the photovoltaic module comprises at least one photovoltaic panel 500 mounted on a spacious side of the housing 300, a protective cover plate 400 is mounted on the side, provided with the photovoltaic panel 500, of the housing 300, the protective cover plate 400 is transparent and covers the photovoltaic panel 500, the energy storage module comprises a storage battery 700 and a control circuit board 600, the storage battery 700 and the control circuit board 600 are both mounted in the housing 300, one end of the power cable 900 penetrates into the lamp shade 101 from the cable trough 206 and is connected to the LED lamp panel 102, and the other end of the power cable 900 penetrates into the housing 300 and is connected to the control circuit board 600.

Because the power cable 900 penetrates into the light fixture 100 from the cable trough 206, the rotating member 202 can wind the power cable 900 in the cable trough 206 when rotating.

The photovoltaic panel 500 is electrically connected to the storage battery 700, the storage battery 700 is electrically connected to the control circuit board 600, and the control circuit board 600 is connected to the LED lamp panel 102 by means of the power cable 900.

In this way, after the pool light is mounted in an outdoor swimming pool, the photovoltaic panel 500 can convert solar energy into electric energy, which is then transmitted to the storage battery 700 to be stored, and the electric energy stored in the storage battery 700 can be transmitted and supplied to the LED lamp panel 102, such that the battery life of the pool light can be prolonged by solar power generation, and frequent replacement of the battery is avoided.

The protective cover plate 400 can protect the photovoltaic panel 500 against damage, and solar light can penetrate through the transparent protective cover plate 400 to be irradiated onto the photovoltaic panel 500. Wherein, the protective cover plate 400 is preferably made from colorless and transparent quartz glass or polymethyl methacrylate, such that light shielded by the protective cover plate 400 can be minimized, thus improving the power generation efficiency of the photovoltaic panel 500.

A control switch is arranged on the control circuit board 600 and penetrates out of the housing 300. In this way, the light fixture 100 can be controlled to be turned on or off by means of the control switch.

In other embodiments not shown, the control circuit board 600 is provided with a human body sensing element and an optical sensing element; when it is detected by the optical sensing element that light is dim, the control circuit board 600 automatically turns on the light fixture 100; and when it is detected by the human body sensing element that a person approaches, the control circuit board 600 automatically turns on the light fixture 100. In this way, the light fixture 100 can be turned on or off automatically to reduce power consumption of the pool light, thus further prolonging the battery life of the pool light.

To sum up, by arranging the cable winding mechanism 200, the light fixture 100 and the rotating member 202 can rotate to wind the redundant portion of the power cable 900 in the cable trough 206 when the pool light is used, thus preventing the appearance of the pool light from being compromised by the long power cable 900.

By arranging the solar power supply assembly, the photovoltaic panel 500 can absorb solar energy and generate power when the power supply device is mounted on the edge of an outdoor swimming pool, and power generated by the photovoltaic panel 500 can be stored and supplied to the lighting device, such that the battery life of the swimming pool can be prolonged, and frequent replacement or charging of the battery is avoided.

Embodiment 2

Referring to FIG. 3 to FIG. 9, and FIG. 9 to FIG. 11,

The invention provides a novel pool light, comprising a power supply device, a lighting device and a power cable 900 mounted between the power supply device and the lighting device, wherein the lighting device comprises a light fixture 100 and a cable winding mechanism 200 for winding the power cable 900, the cable winding mechanism 200 comprises a rotating member 202 having one side fixedly connected to the light fixture 100 and a base plate 201 rotatably connected to the other side of the rotating member 202, a recess between the periphery of the rotating member 202 and the periphery of the base plate 201 forms a cable trough 206 allowing the power cable 900 to be wound therein, the power supply device comprises a housing 300 to be mounted on an edge of a swimming pool and a solar power supply assembly mounted on the housing 300, and the solar power supply assembly comprises a photovoltaic module and an energy storage module.

This embodiment differs from Embodiment 1 in the following aspects: a mounting assembly is arranged on a side, facing the edge of the swimming pool, of the housing 300 and comprises a mounting plate 800 separated from the housing 300, and a quick assembly and disassembly structure is arranged between the mounting plate 800 and the housing 300; a surface, facing the mounting plate 800, of the housing 300 is defined as a first mating surface 301; a surface, facing the housing, of the mounting plate 800 is defined as a second mating surface 801; the quick assembly and disassembly structure comprises a first clamping piece 303 and a second clamping piece 802, the first clamping piece 303 is mounted on the first mating surface 301, and the second clamping piece 802 is used together with the first clamping piece and mounted on the second mating surface 801; and at least one hole 302 is formed in one side of the first mating surface 301.

In this embodiment, the mounting plate 800 and the housing 300 are both L-shaped, such that the mounting plate 800 and the housing 300 can be both attached to right-angle sides of the swimming pool; through-holes are formed in the mounting plate 800, and screws can be inserted into the through-holes to fix the mounting plate 800 to the edge of the swimming pool with bolts; and the mounting plate 800 is coated with a 3M adhesive, and the mounting plate 800 can be bonded on the edge of the swimming pool with the 3M adhesive.

In other embodiments not shown, the housing 300 and the mounting plate 800 may be in other corresponding solid geometric shapes to adapt to edges of swimming pools in various other shapes.

Based on the above description, the cross-section of the first clamping piece 303 and the cross-section of the second clamping piece 802 are both L-shaped, and at least two first clamping pieces 303 and at least two second clamping pieces 802 are arranged axially symmetrically. By adopting such a structure, the first clamping piece 303 can be clamped into the second clamping piece 802 to clamp together the housing 300 and the mounting plate 800, such that the housing 300 and the mounting plate 800 can be quickly assembled and disassembled to quickly mount the power supply device on the edge of the swimming pool or easily and quickly detach the power supply device from the edge of the swimming pool.

In other embodiments not shown, the first clamping piece 303 and the second clamping piece 802 may be clamped in the form of dovetail grooves. In this case, only one first clamping piece 303 and only one second clamping piece 802 can be arranged. The first clamping piece 303 and the second clamping piece 802 are not limited to this form and may be in any other shapes that can realize clamping.

Figure 10:
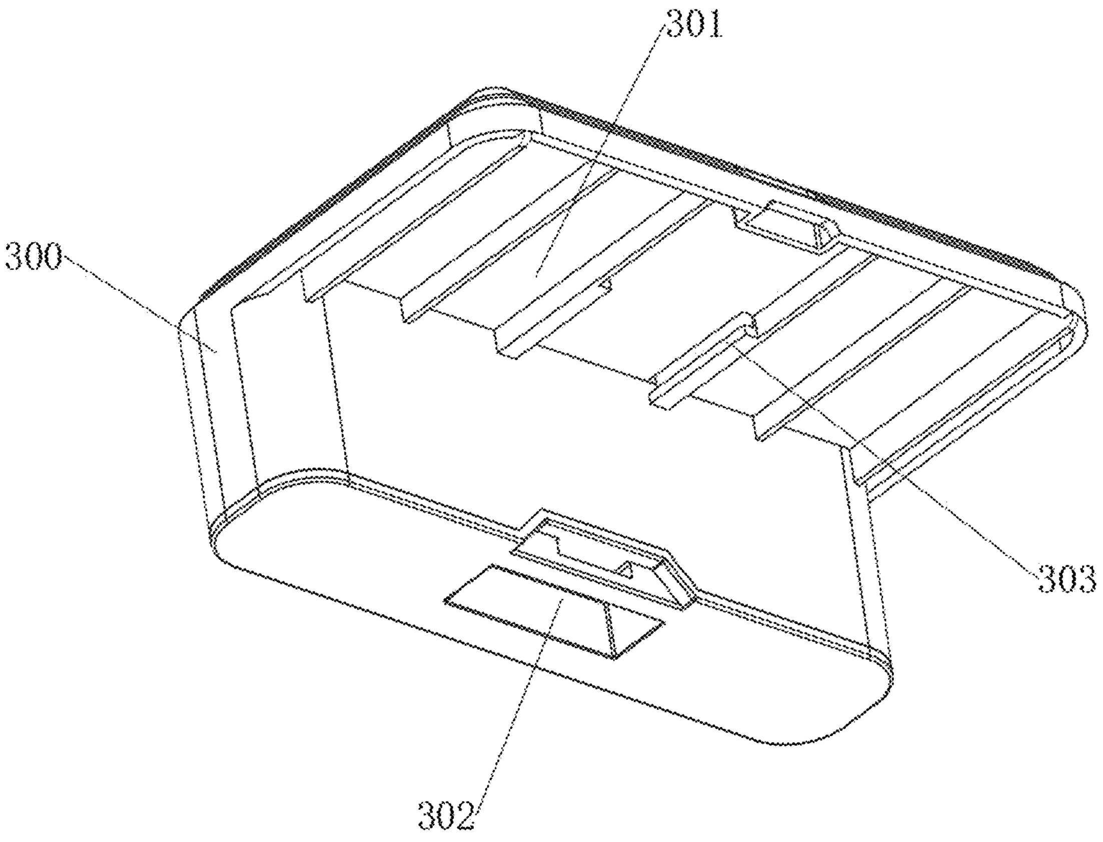
FIG. 10 is a schematic structural view of a power supply device according to Embodiment 2 of the invention.
Figure 11:
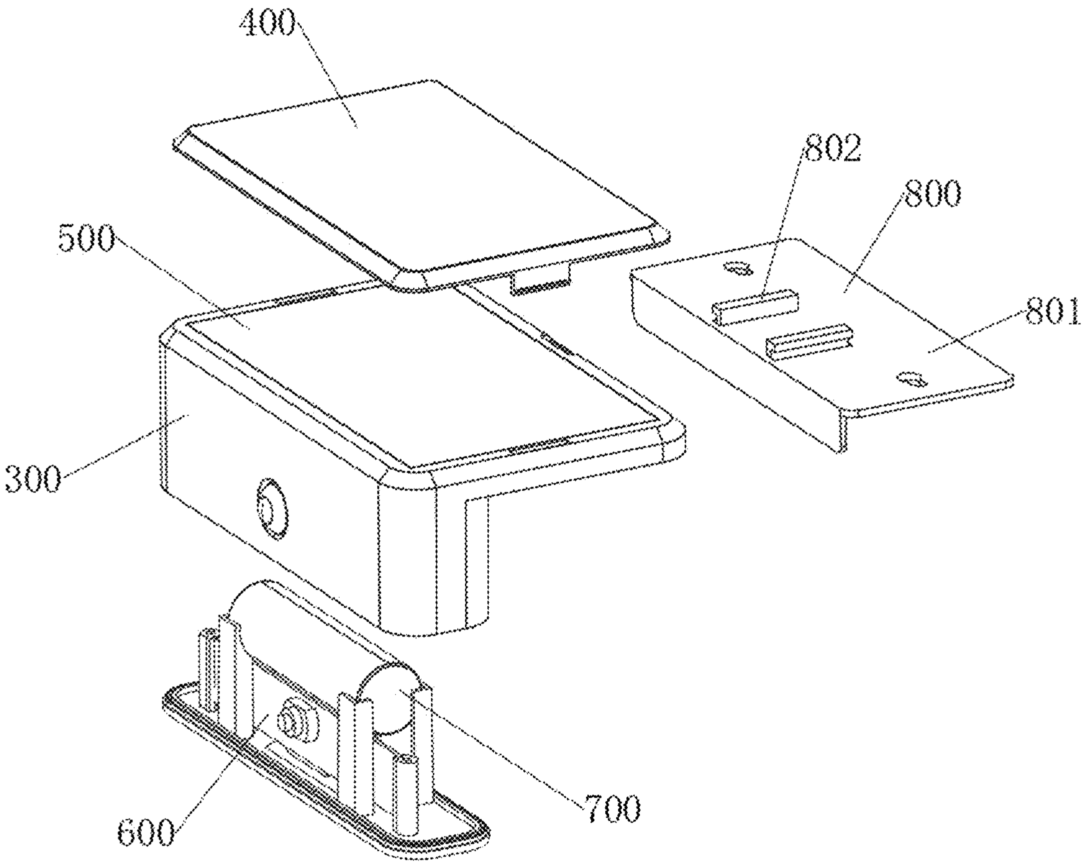
FIG. 11 is an exploded view of the power supply device according to Embodiment 2 of the invention.

A flexible element such as a ribbon or a tie can penetrate through the holes 302. In the absence of the mounting plate 800, a ribbon or a tie can penetrate through the holes 302 to fix the power supply device to a protective handrail on the edge of the swimming pool or other suitable rods. In other embodiments not shown, the holes 302 may be formed in two sides of the first mating surface 301, as shown in FIG. 10. In this way, a ribbon or a tie can penetrate through the two holes 302 to be tied on a handrail more stably.

To sum up, by arranging the mounting assembly, the power supply device can be quickly mounted on or detached from the edge of the swimming pool, thus improving the installation convenience of the pool light.

The invention further provides a pool lighting method, using a novel pool light, wherein the novel pool light comprises a power supply device, a lighting device and a power cable 900 mounted between the power supply device and the lighting device, the lighting device comprises a light fixture 100 and a cable winding mechanism 200 for winding the power cable 900, the cable winding mechanism 200 comprises a rotating member 202 having one side fixedly connected to the light fixture 100 and a base plate 201 rotatably connected to the other side of the rotating member 202, a recess between the periphery of the rotating member 202 and the periphery of the base plate 201 forms a cable trough 206 allowing the power cable 900 to be wound therein, the power supply device comprises a housing 300 to be mounted on an edge of a swimming pool, a mounting assembly is arranged on a side, facing the edge of the swimming pool, of the housing and comprises a mounting plate 800 separated from the housing 300, and a quick assembly and disassembly structure is arranged between the mounting plate 800 and the housing 300 and comprises a first clamping piece 303 and a second clamping piece 802; the pool lighting method comprises the following steps:

Step 1, the mounting plate 800 is mounted on the edge of the swimming pool, wherein the mounting plate 800 is fixed with screws or an adhesive when mounted on the edge of the swimming pool;

Step 2, the housing 300 is mounted on the mounting plate 800 by means of the quick assembly and disassembly structure, wherein when the housing 300 is mounted on the mounting plate 800, the first clamping piece is aligned with and inserted into the second clamping piece 802 to clamp the housing 300 on the mounting plate 800;

Step 3, the lighting device is mounted in the swimming pool, wherein the base plate 201 is coated with glue and then bonded in the swimming pool with the glue;

Step 4, a redundant portion of the power cable 900 is wound on the cable winding mechanism 200 to be stored, wherein when the power cable 900 is wound, the light fixture 100 and the rotating member 202 rotate, and the power cable 900 is driven by the rotating member 202 to be wound in the cable trough 206; and Step 5, the lighting device is turned on to light the swimming pool.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, “can,” “could,” “might,” “may,” “e.g.,” and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list. The use of “adapted to” or “configured to” herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A novel pool light, comprising a power supply device, a lighting device, and a power cable mounted between the power supply device and the lighting device, wherein:

the lighting device comprises a light fixture and a cable winding mechanism for winding the power cable; and the cable winding mechanism comprises a rotating member having one side fixedly connected to the light fixture and a base plate rotatably connected to the other side of the rotating member, and a recess between a periphery of the rotating member and a periphery of the base plate forms a cable trough allowing the power cable to be wound therein; and the power supply device comprises a housing to be mounted on an edge of a swimming pool and a solar power supply assembly mounted on the housing, and the solar power supply assembly comprises a photovoltaic module and an energy storage module.

2. The novel pool light according to claim 1, wherein the light fixture comprises a lamp shade and an LED lamp panel mounted in the lamp shade, at least one lamp bead is mounted on the LED lamp pane, and the rotating member is mounted on a side of the lamp shade.

3. The novel pool light according to claim 2, wherein at least one lens is mounted on a side, backing onto the base plate, of the lamp shade and is used together with the lamp bead, and an inner end of the lens penetrates into the lamp shade and is located outside the lamp bead.

4. The novel pool light according to claim 1, wherein a middle of the base plate is inlaid in the rotating member and rotatably connected to the rotating member.

5. The novel pool light according to claim 2, wherein a magnet is mounted in a side, facing the lamp shade, of the rotating member; a magnetic element is arranged on a side, backing onto the rotating member, of the base plate; and the rotating member, the magnet, the base plate and the magnetic element are arranged coaxially.

6. The novel pool light according to claim 5, wherein the magnet attracts the magnetic element through the base plate and the rotating member, and the base plate and the magnetic element are covered with a sealing cover for sealing the magnetic element.

7. The novel pool light according to claim 1, wherein the photovoltaic module comprises at least one photovoltaic panel mounted on a spacious side of the housing, a protective cover plate is mounted on the side, provided with the photovoltaic panel, of the housing, and the protective cover plate is transparent and covers the photovoltaic panel.

8. The novel pool light according to claim 2, wherein the energy storage module comprises a storage battery and a control circuit board, and the storage battery and the control circuit board are both mounted in the housing.

9. The novel pool light according to claim 8, wherein one end of the power cable penetrates into the lamp shade from the cable trough and is connected to the LED lamp panel, and the other end of the power cable penetrates into the housing and is connected to the control circuit board.

10. A novel pool light, comprising a power supply device, a lighting device and a power cable mounted between the power supply device and the lighting device, wherein:

a cable winding mechanism comprises a rotating member having one side fixedly connected to a light fixture and a base plate rotatably connected to the other side of the rotating member, and a recess between a periphery of the rotating member and a periphery of the base plate forms a cable trough allowing the power cable to be wound therein; and the power supply device comprises a housing to be mounted on an edge of a swimming pool and a solar power supply assembly mounted on the housing, and the solar power supply assembly comprises a photovoltaic module and an energy storage module; and a mounting assembly is arranged on a side, facing the edge of the swimming pool, of the housing and comprises a mounting plate separated from the housing, and a quick assembly and disassembly structure is arranged between the mounting plate and the housing.

11. The novel pool light according to claim 10, wherein a surface, facing the mounting plate, of the housing is defined as a first mating surface, and a surface, facing the housing, of the mounting plate is defined as a second mating surface.

12. The novel pool light according to claim 11, wherein the quick assembly and disassembly structure comprises a first clamping piece and a second clamping piece, the first clamping piece is mounted on the first mating surface, and the second clamping piece is used together with the first clamping piece and mounted on the second mating surface.

13. The novel pool light according to claim 11, wherein at least one hole is formed in a side of the first mating surface.

14. A pool lighting method, using a novel pool light, the novel pool light comprising a power supply device, a lighting device and a power cable mounted between the power supply device and the lighting device, the lighting device comprising a light fixture and a cable winding mechanism for winding the power cable, the cable winding mechanism comprising a rotating member having one side fixedly connected to the light fixture and a base plate rotatably connected to the other side of the rotating member, a recess between a periphery of the rotating member and a periphery of the base plate forming a cable trough allowing the power cable to be wound therein, the power supply device comprising a housing to be mounted on an edge of a swimming pool, a mounting assembly being arranged on a side, facing the edge of the swimming pool, of the housing and comprising a mounting plate separated from the housing, and a quick assembly and disassembly structure being arranged between the mounting plate and the housing and comprising a first clamping piece and a second clamping piece; the pool lighting method comprising the following steps:

Step 1, mounting the mounting plate on the edge of the swimming pool;

Step 2, mounting the housing on the mounting plate by the quick assembly and disassembly structure;

Step 3, mounting the lighting device in the swimming pool;

Step 4, winding a redundant portion of the power cable on the cable winding mechanism; and Step 5, turning on the lighting device to light the swimming pool.

15. The pool lighting method according to claim 14, wherein the mounting plate is fixed with screws or an adhesive when mounted on the edge of the swimming pool.

16. The pool lighting method according to claim 14, wherein when the housing is mounted on the mounting plate, the first clamping piece is aligned with and inserted into the second clamping piece to clamp the housing on the mounting plate.

17. The pool lighting method according to claim 14, wherein when the lighting device is mounted, the base plate is coated with glue and then bonded in the swimming pool with the glue.

18. The pool lighting method according to claim 14, wherein when the power cable is wound, the light fixture and the rotating member rotate, and the power cable is driven by the rotating member to be wound in the cable trough.

* * * * *